US012081933B2

(12) United States Patent
Vijayakumar et al.

(10) Patent No.: US 12,081,933 B2
(45) Date of Patent: Sep. 3, 2024

(54) ACTIVITY DETECTION USING A HEARING INSTRUMENT

(71) Applicant: Starkey Laboratories, Inc., Eden Prairie, MN (US)

(72) Inventors: Vishal Vijayakumar, Edina, MN (US); Matthew D. Kleffner, Eden Prairie, MN (US); Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 47 days.

(21) Appl. No.: 17/664,155

(22) Filed: May 19, 2022

(65) Prior Publication Data

US 2022/0279266 A1 Sep. 1, 2022

Related U.S. Application Data

(63) Continuation of application No. PCT/US2020/062049, filed on Nov. 24, 2020.

(60) Provisional application No. 62/941,232, filed on Nov. 27, 2019.

(51) Int. Cl.
*H04R 1/10* (2006.01)
*H04R 25/00* (2006.01)

(52) U.S. Cl.
CPC ......... *H04R 1/1041* (2013.01); *H04R 25/505* (2013.01)

(58) Field of Classification Search
CPC .. H04R 1/1041; H04R 25/505; H04R 25/507; H04R 25/00; H04R 1/1008; H04R 2225/41; H04R 25/70; H04R 1/1016; H04R 25/652; H04R 25/554; H04R 25/606; H04R 2225/55; H04R 25/604; H04R 2420/07; H04R 2460/13; H04R 1/105; H04R 25/30; H04R 2225/023; H04R 1/1075; H04R 1/10; H04R 2225/025
See application file for complete search history.

(56) References Cited

U.S. PATENT DOCUMENTS

| | | | | |
|---|---|---|---|---|
| 8,021,297 | B2 | 9/2011 | Aerts | |
| 8,655,004 | B2 | 2/2014 | Prest et al. | |
| 9,146,327 | B2 | 9/2015 | Suppes et al. | |
| 10,735,848 | B2 * | 8/2020 | Pergament | A61B 5/0205 |
| 2008/0154098 | A1 | 6/2008 | Morris et al. | |
| 2011/0135126 | A1 * | 6/2011 | Gozen | H04R 25/505 381/313 |
| 2013/0230150 | A1 | 9/2013 | Weiss | |
| 2015/0271608 | A1 * | 9/2015 | Sabin | H04R 25/30 381/314 |

(Continued)

OTHER PUBLICATIONS

Atallah et al., "The use of pervasive sensing for behaviour profiling—a survey", Pervasive and Mobile Computing, vol. 5, No. 5, Oct. 1, 2009, pp. 447-464.

(Continued)

*Primary Examiner* — Akelaw Teshale
(74) *Attorney, Agent, or Firm* — Shumaker & Sieffert, P.A.

(57) ABSTRACT

A computing system includes a memory and at least one processor. The memory is configured to store motion data indicative of motion of a hearing instrument. The at least one processor is configured to determine a type of activity performed by a user of the hearing instrument and output data indicating the type of activity performed by the user.

20 Claims, 4 Drawing Sheets

(56) References Cited

U.S. PATENT DOCUMENTS

| | | | |
|---|---|---|---|
| 2016/0007933 A1 | 1/2016 | Duddy et al. | |
| 2018/0125423 A1 | 5/2018 | Chang et al. | |
| 2018/0160237 A1* | 6/2018 | Rosenthal | H04R 25/453 |
| 2018/0242860 A1 | 8/2018 | LeBoeuf et al. | |
| 2019/0231253 A1 | 8/2019 | Ahmed et al. | |
| 2020/0066264 A1* | 2/2020 | Kwatra | G10L 25/63 |

OTHER PUBLICATIONS

International Preliminary Report on Patentability from International Application No. PCT/US2020/062049, dated Jun. 9, 2022, 17 pp.
International Search Report and Written Opinion of International Application No. PCT/US2020/062049, dated Apr. 29, 2021, 24pp.
Wang et al., "Context Recognition for Adaptive Hearing-Aids", 2015 IEEE 13th International Conference on Industrial Informatics (INDIN), IEEE, Jul. 22, 2015, pp. 1102-1107.
Communication pursuant to Rules 161(1) and 162 EPC from counterpart European 20828432.3 dated Jul. 5, 2022, 3 pp.
Response to Communication Pursuant to Rules 161(1) and 162 EPC dated Jul. 5, 2022, from counterpart European Application No. 20828432.3, filed Jan. 12, 2023, 18 pp.
Communication pursuant to Article 94(3) EPC from counterpart European Application No. 20828432.3 dated Apr. 10, 2024, 7 pp.
Response to Communication pursuant to Article 94(3) EPC dated Apr. 10, 2024, from counterpart European Application No. 20828432.3 filed Jul. 11, 2024, 16 pp.

* cited by examiner

ACTIVITY DETECTION USING A HEARING INSTRUMENT

This application is a continuation of International Application No. PCT/US2020/062049, filed on Nov. 24, 2020, which claims the benefit of U.S. Provisional Patent Application 62/941,232, filed Nov. 27, 2019, the entire content of both of which are incorporated by reference herein.

TECHNICAL FIELD

This disclosure relates to hearing instruments.

BACKGROUND

A hearing instrument is a device designed to be worn on, in, or near one or more of a user's ears. Example types of hearing instruments include hearing aids, earphones, earbuds, telephone earpieces, cochlear implants, and other types of devices. In some examples, a hearing instrument may be implanted or osseointegrated into a user. Hearing instruments typically have limited battery and processing power.

SUMMARY

In general, this disclosure describes techniques for detecting activities performed by a user of a hearing instrument by a computing device onboard the hearing instrument. The computing device utilizes motion data from one or more motion sensing devices onboard the hearing instrument to determine the activity performed by the user. In one example, the computing device includes a plurality of machine trained activity models that are each trained to detect a respective activity. The activity models are each assigned a position in a hierarchy and the computing device applies the activity models to the motion data one at a time according to the position in the hierarchy. If the output of a particular activity model indicates that the user is not performing the activity that the particular activity model is trained to detect, the computing device applies the next activity model in the hierarchy to the motion data to determine whether the user is performing a different activity, and so on.

Utilizing motion data from sensors within the hearing instrument to detect activities performed by the user may enable the computing device to more accurately detect the activity compared to sensors worn on other parts of the user's body. In contrast to techniques that transfer motion data to another device for detecting activities performed by the user, the computing device onboard the hearing instrument may determine which activities the user performs locally, which may enable the computing device to consume less power. Moreover, applying machine trained activity models one at a time according to a hierarchy of activity models that are each trained to detect a single type of activity (e.g., compared to applying a single, complex machine trained activity model trained to select an activity from numerous different types of activities) may reduce processing power consumed by the computing device, which may potentially reduce the amount of battery power consumed to classify activities performed by the user.

In one example, a computing system includes a memory and at least one processor. The memory is configured to store a plurality of machine trained models. The at least one processor is configured to: determine, by applying a hierarchy of the plurality of machine trained models to motion data indicative of motion of a hearing instrument, a type of activity performed by a user of the hearing instrument; and responsive to determining the type of activity performed by the user, output data indicating the type of activity performed by the user In another example, a method is described that includes: receiving, by at least one processor, motion data indicative of motion of a hearing instrument; determining, by the at least one processor, a type of activity performed by a user of the hearing instrument by applying a hierarchy of the plurality of machine trained models to the motion data; and responsive to determining the type of activity performed by the user, outputting data indicating the type of activity performed by the user.

In another example, a computer-readable storage medium is described. The computer-readable storage medium includes instructions that, when executed by at least one processor of a computing device, cause at least one processor to: receive motion data indicative of motion of a hearing instrument; determine, by applying a hierarchy of the plurality of machine trained models to the motion data, a type of activity performed by a user of the hearing instrument; and responsive to determining the type of activity performed by the user, output data indicating the type of activity performed by the user.

In yet another example, the disclosure describes means for receiving motion data indicative of motion of a hearing instrument; means for determining, by applying a hierarchy of the plurality of machine trained models to the motion data, a type of activity performed by a user of the hearing instrument; and means for outputting, responsive to determining the type of activity performed by the user, data indicating the type of activity performed by the user.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
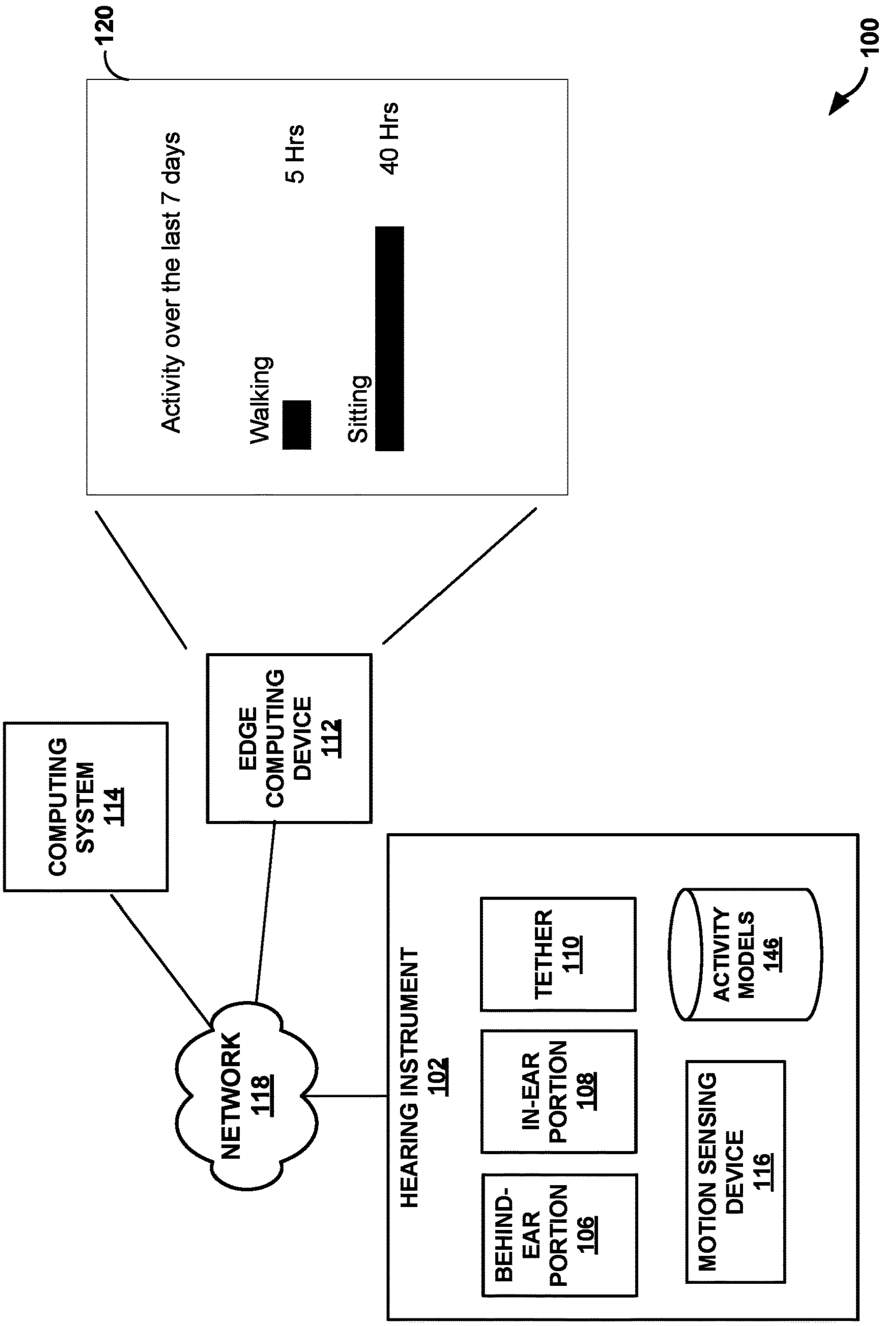
FIG. 1 is a conceptual diagram illustrating an example system for performing hearing assessments, in accordance with one or more aspects of the present disclosure.

FIG. 1 is a conceptual diagram illustrating an example system for detecting activities performed by a user of a hearing instrument, in accordance with one or more aspects of the present disclosure. System 100 includes at least one hearing instrument 102, an edge computing device 112, a computing system 114, and a communication network 118. System 100 may include additional or fewer components than those shown in FIG. 1.

Hearing instrument 102, edge computing device 112, and computing system 114 may communicate with one another via communication network 118. Communication network 118 may comprise one or more wired or wireless communication networks, such as cellular data networks, WIFI™ networks, BLUETOOTH™ networks, the Internet, and so on. Examples of edge computing device 112 and computing system 114 include a mobile phone (e.g., a smart phone), a wearable computing device (e.g., a smart watch), a laptop computer, a desktop computing device, a television, a distributed computing system (e.g., a "cloud" computing system), or any type of computing system.

Hearing instrument 102 is configured to cause auditory stimulation of a user. For example, hearing instrument 102 may be configured to output sound. As another example, hearing instrument 102 may stimulate a cochlear nerve of a user. As the term is used herein, a hearing instrument may refer to a device that is used as a hearing aid, a personal sound amplification product (PSAP), a headphone set, a hearable, a wired or wireless earbud, a cochlear implant system (which may include cochlear implant magnets, cochlear implant transducers, and cochlear implant processors), a device that uses a bone conduction pathway to transmit sound, or another type of device that provides auditory stimulation to a user. In some instances, hearing instruments 102 may be worn. For instance, a single hearing instrument 102 may be worn by a user (e.g., with unilateral hearing loss). In another instance, two hearing instruments, such as hearing instrument 102, may be worn by the user (e.g., when the user has bilateral hearing loss) with one hearing instrument in each ear. In some examples, hearing instruments 102 are implanted on the user (e.g., a cochlear implant that is implanted within the ear canal of the user). The described techniques are applicable to any hearing instruments that provide auditory stimulation to a user.

In some examples, hearing instrument 102 is a hearing assistance device. In general, there are three types of hearing assistance devices. A first type of hearing assistance device includes a housing or shell that is designed to be worn in the ear for both aesthetic and functional reasons. The housing or shell encloses electronic components of the hearing instrument. Such devices may be referred to as in-the-ear (ITE), in-the-canal (ITC), completely-in-the-canal (CIC), or invisible-in-the-canal (IIC) hearing instruments.

A second type of hearing assistance device, referred to as a behind-the-ear (BTE) hearing instrument, includes a housing worn behind the ear which may contain all of the electronic components of the hearing instrument, including the receiver (i.e., the speaker). An audio tube conducts sound from the receiver into the user's ear canal.

A third type of hearing assistance device, referred to as a receiver-in-canal (RIC) hearing instrument, has a housing worn behind the ear that contains some electronic components and further has a housing worn in the ear canal that contains some other electronic components, for example, the receiver. The behind-the-ear housing of a RIC hearing instrument is connected (e.g., via a tether or wired link) to the housing with the receiver that is worn in the ear canal. Hearing instrument 102 may be an ITE, ITC, CIC, IIC, BTE, RIC, or another type of hearing instrument.

In the example of FIG. 1, hearing instrument 102 is configured as a RIC hearing instrument and includes its electronic components distributed across three main portions: behind-ear portion 106, in-ear portion 108, and tether 110. In operation, behind-ear portion 106, in-ear portion 108, and tether 110 are physically and operatively coupled together to provide sound to a user for hearing. Behind-ear portion 106 and in-ear portion 108 may each be contained within a respective housing or shell. The housing or shell of behind-ear portion 106 allows a user to place behind-ear portion 106 behind his or her ear whereas the housing or shell of in-ear portion 108 is shaped to allow a user to insert in-ear portion 108 within his or her ear canal. While hearing instrument 102 is illustrated in FIG. 1 as a RIC hearing instrument, in some examples, hearing instrument 102 does not include tether 110 and includes only one of behind-ear portion 106 or in-ear portion 108. That is, in some examples, hearing instrument 102 includes a behind-ear portion 106 without including in-ear portion 108 and tether 110 or includes in-ear portion 108 without including behind-ear portion 106 and tether 110.

In-ear portion 108 may be configured to amplify sound and output the amplified sound via an internal speaker (also referred to as a receiver) to a user's ear. That is, in-ear portion 108 may receive sound waves (e.g., sound) from the environment and may convert the sound into an input signal. In-ear portion 108 may amplify the input signal using a pre-amplifier, may sample the input signal, and may digitize the input signal using an analog-to-digital (A/D) converter to generate a digitized input signal. Audio signal processing circuitry of in-ear portion 108 may process the digitized input signal into an output signal (e.g., in a manner that compensates for a user's hearing deficit). In-ear portion 108 then drives an internal speaker to convert the output signal into an audible output (e.g., sound waves).

Behind-ear portion 106 of hearing instrument 102 may be configured to contain a rechargeable or non-rechargeable power source that provides electrical power, via tether 110, to in-ear portion 108. In some examples, in-ear portion 108 includes its own power source. In some examples where in-ear portion 108 includes its own power source, a power source of behind-ear portion 106 may supplement the power source of in-ear portion 108.

Behind-ear portion 106 may include various other components, in addition to a rechargeable or non-rechargeable power source. For example, behind-ear portion 106 may include a radio or other communication unit to serve as a communication link or communication gateway between hearing instrument 102 and the outside world. Such a radio may be a multi-mode radio or a software-defined radio configured to communicate via various communication protocols. In some examples, behind-ear portion 106 includes a processor and memory. For example, the processor of behind-ear portion 106 may be configured to receive sensor data from sensors within in-ear portion 108 and analyze the sensor data or output the sensor data to another device (e.g., edge computing device 112, such as a mobile phone). In addition to sometimes serving as a communication gateway, behind-ear portion 106 may perform various other advanced functions on behalf of hearing instrument 102; such other functions are described below with respect to the additional figures.

Tether 110 forms one or more electrical links that operatively and communicatively couple behind-ear portion 106 to in-ear portion 108. Tether 110 may be configured to wrap from behind-ear portion 106 (e.g., when behind-ear portion 106 is positioned behind a user's ear) above, below, or around a user's ear, to in-ear portion 108 (e.g., when in-ear portion 108 is located inside the user's ear canal). When physically coupled to in-ear portion 108 and behind-ear portion 106, tether 110 is configured to transmit electrical power from behind-ear portion 106 to in-ear portion 108. Tether 110 is further configured to exchange data between portions 106 and 108, for example, via one or more sets of electrical wires.

In some examples, hearing instrument 102 includes at least one motion sensing device 116 configured to detect motion of the user (e.g., motion of the user's head). Hearing instrument 102 may include a motion sensing device disposed within behind-ear portion 106, within in-ear portion 108, or both. Examples of motion sensing devices include an accelerometer, a gyroscope, a magnetometer, among others. Motion sensing device 116 generates motion data indicative of the motion. For instance, the motion data may include unprocessed data and/or processed data representing the motion. Unprocessed data may include acceleration data indicating an amount of acceleration in one or more dimensions (e.g., x, y, and/or z-dimensions) over time or gyroscope data indicating a speed or rate of rotation in one or more dimensions over time. In some examples, the motion data may include processed data, such as summary data indicative of the motion. For instance, in one example, the summary data may include data indicating a degree of head rotation (e.g., degree of pitch, yaw, and/or roll) of the user's head. In some instances, the motion data indicates a time associated with the motion, such as a timestamp indicating a time at which the motion data was generated. In some examples, each portion of motion data is associated with a time period. For example, motion sensing device 116 may be configured to sample one or more motion parameters (e.g., acceleration) with a particular frequency (e.g., sample rate of 60 Hz, 100 Hz, 120 Hz, or any other sample rate) and to divide the sampled motion parameters into different sample sets that are each associated with a respective time period (e.g., 1 second, 3 seconds, 5 seconds, or any other period of time).

In accordance with one or more techniques of this disclosure, hearing instrument 102 determines a type of activity performed by the user of hearing instrument 102 during each time period based at least in part on the motion data generated during the respective time period. Example types of activities performed by the user include running, walking, biking, aerobics, resting, sitting, standing, lying down, among others. In one example, hearing instrument 102 includes a plurality of activity models 146 that are each indicative of a different activity performed by the user of hearing instrument 102. Activity models 146 may include one or more machine trained models, such as neural networks, deep-neural networks, parametric models, support vector machines, or other types of machine-trained models. In some examples, activity models 146 are invariant to the position or orientation of motion sensing device 116 that generates the motion data applied to activity models 146. Each of activity models 146 may be trained to determine whether the user is performing a particular type of activity. For example, a first activity model of activity models 146 may determine whether a user is running and a second activity model of activity models 146 may determine whether the user is walking. That is, each of activity models 146 may be trained to detect a single type of activity, and output data indicating whether or not the user is performing the particular type of activity that the respective activity model of activity models 146 is trained to detect. In other words, each of activity models 146 may output data indicating that the user is performing the type of activity that activity model is trained to detect or data indicating that the user is not performing the type of activity that the activity model is trained to detect. Said yet another way, the output of each of activity models 146 may be a binary output (e.g., "running" or "not running").

In some scenarios, hearing instrument 102 applies a hierarchy of activity models 146 to the motion data to determine or classify the activity performed by the user of hearing instrument 102. For instance, hearing instrument 102 may apply a first activity model of activity models 146 associated with a first activity (e.g., running) to the motion data collected during a first time period to determine whether the user of hearing instrument 102 performed the first activity during the first time period. In response to determining that the user performed the first type of activity during the first time period, hearing instrument 102 may cease applying the subsequent or subordinate activity models 146 to the motion data for the first time period.

In some instances, hearing instrument 102 applies a second activity model of activity models 146 to the motion data for the first time period in response to determining that the user did not perform the first type of activity. If hearing instrument 102 determines the user performed the second type of activity, hearing instrument 102 ceases applying subordinate activity models 146 to the motion data generated during the first time period. If hearing instrument 102 determines the user did not perform the second type of activity, hearing instrument 102 applies another subordinate activity model of activity models 146 from the hierarchy of activities models to the motion data generated during the first time period, and so on. In some instances, hearing instrument 102 determines that the user did not perform any of the types of activities that activity models 146 are trained to detect. In such instances, hearing instrument 102 may determine the type of activity performed by the user is unknown.

Hearing instrument 102 may determine a sub-type of the activity performed by the user of hearing instrument 102. In one scenario, when the type of the activity is resting, sub-types of activities may include sitting, lying down, or sleeping, among other resting activities. In another scenario, when the type of the activity is aerobic, sub-types of activities may include yoga, pilates, or karate, among other aerobic activities. For example, hearing instrument 102 may determine the type of activity performed by the user by applying the motion data to one or more activity models 146 associated with a respective sub-type of a type of activity. In some scenarios, hearing instrument 102 applies the hierarchy of activity models associated with the type of activity one at a time in a similar manner used for determining the type of activity. For instance, hearing instrument 102 may apply a particular activity model of activity models 146 to the motion data generated during the first period of time to determine whether the user performed a sub-type of activity that the particular activity model of activity models 146 is trained to detect. If hearing instrument 102 determines the user did not perform that sub-type of activity, in some instances, hearing instrument 102 applies the next subordinate activity model of activity models 146 to the motion data to determine whether the user performed the sub-type of activity that the subordinate activity model is trained to detect.

In one example, activity models 146 are ranked or ordered by the probability of the respective activities being performed. For example, the first or primary activity model in the hierarchy of activity models 146 may be the type of activity that is most often performed by the user of hearing instrument 102 or by a population of users. In such examples, each subordinate activity model may be placed in the hierarchy in descending order according to the probability of that activity being performed. One example hierarchy may include determining whether the user is sleeping, and if not sleeping then determining whether the user is sitting, and if not sitting, then determining whether the user is running, and so forth. Ordering activity models 146 based on the probability of an activity being performed may enable hearing instrument 102 to determine the type of activity being performed more quickly, which may reduce the processing power required to determine the type of activity and potentially increase the battery life of hearing instrument 102.

In another example, activity models 146 are ranked within the hierarchy based on the parameters (e.g., number of inputs, number of hidden layers, etc.) of the respective activity models. For example, an activity model of activity models 146 trained to detect one activity (e.g., running) may utilize fewer inputs or have fewer layers (e.g., which may require less processing power and hence less battery power) than another activity model of activity models 146 trained to detect another activity (e.g., biking). In such examples, the activity model trained to detect running may be ordered higher in the hierarch of activity models than the activity model trained to detect biking. Ordering activity models 146 based on the parameters of the respective activity models may reduce the processing power required to determine the type of activity and potentially increase the battery life of hearing instrument 102.

Hearing instrument 102 determines the type of activity performed by the user for each time period. For example, hearing instrument 102 may apply the hierarchy of activity models 146 to the motion data for each respective time period to determine an activity performed by the user during each respective time period, in a similar manner as described above.

Responsive to determining the type of activity performed by the user of hearing instrument 102, hearing instrument 102 may store data indicating the type of activity and/or output a message indicating the type of activity to one or more computing devices (e.g., edge computing device 112 and/or computing system 114). For example, hearing instrument may cache data indicating the type of activity and a timestamp associated with that activity. Additionally or alternatively, hearing instrument 102 may store processed motion data, such as the slope of the acceleration, maximum jerk, or any other processed motion data. Hearing instrument may transmit the data indicating the type of activity, timestamp, and processed motion data and may transmit the data to edge computing device 112 periodically (e.g., every 30 seconds, every minute, every 5 minutes, etc.). Storing the data and transmitting the data periodically may increase battery life by reducing the amount of data transmitted to edge computing device 112.

Responsive to determining that the type of activity being performed is unknown, in some instances, hearing instrument 102 outputs a message to another computing device (e.g., edge computing device 112) indicating that the type of activity is unknown. In some instances, the message includes an indication of the motion data, such as the processed and/or unprocessed data. In some instances, edge computing device 112 may include additional computing resources and may utilize one or more additional machine trained models to determine the type of activity performed by the user of hearing instrument 102.

In some scenarios, edge computing device 112 performs post-processing on the data received from hearing instrument 102. In some examples, the post processing includes outputting a graphical user interface 120 that includes data summarizing the activities performed by the user over multiple time periods. In another example, edge computing device 112 performs the post processing by applying a machine learning ensemble model to characterize the stream of activities identified by hearing instrument 102. Examples of an ensemble model include a set of weak machine learning algorithms, such as a shallow decision tree or a neural network. In yet another example, edge computing device 112 performs post processing by analyzing patterns in the types of activities performed (e.g., using more complex machine learning or deep learning models) to offer suggestions on improving the quality of life of the user of hearing instrument 102.

In some examples, edge computing device 112 and/or hearing instrument 102 includes a voice assistant configured to prompt a user to begin an activity and/or proactively engage the user while the user performs an activity. For example, the voice assistant may cause a speaker of hearing instrument 102 to audibly count steps, repetitions, or sets of exercises performed by the user. In another example, the voice assistant may monitor the activities of the user to set alerts or reminders to perform a type of activity.

Edge computing device 112 may output a GUI (not shown) that enables a user to identify the activity performed by the user. In some examples, the activity identified by the user may be referred to as a “ground truth activity”. In this way, edge computing device 112 (and/or computing system 114) may update or re-train one or more activity models 146 based on the activity identified by the user and the sensor data associated with that activity and transmit the updated activity model to to hearing instrument 102. Hearing instrument 102 may store the updated activity model which may enable hearing instrument 102 to more accurately identify the types of activities performed by the user.

In some examples, edge computing device 112 determines an effectiveness of a rehabilitation procedure, such as balance training. For example, edge computing device 112 may apply one or more activity models to the sensor data (e.g., motion data) to identify deviations between the actual activity performed by the user (e.g., an aerobic exercise or posture) to the expected activity.

In some scenarios, computing system 114 may update one or more activity models 146 based on historical data from a plurality of users of different hearing instruments 102. For example, computing system 114 may collect motion data and data indicating types of activities for a population of users of different hearing instruments and may identify trends and abnormal activities across age, sex and demographics based on the data. Computing system 114 may update existing activity models or generate new activity models and transmit the updated and/or new activity models to edge computing device 112 and/or hearing instrument 102, which may increase the performance of activity models 146 stored on hearing instrument 102 or activity models stored on edge computing device 112. In one instance, computing system 114 performs a global update to one of activity models 146 and transmits the updated activity model to each hearing instrument 102. For instance, in an example where an activity model of activity models 146 includes a neural network, computing system 114 may update the structure of the model (e.g., the inputs to the activity model and/or the number of hidden layers of the activity model) and/or the parameters of the model (e.g., the weights of the various nodes) for a population of hearing instruments 102 and may transmit the updated activity model to hearing instrument 102 (e.g., via edge computing device 112). In another instance, computing system 114 performs a personalized update to activity model and transmits the personalized updated activity model to a single hearing instrument 102. That is, computing system 114 may customize an activity model for a specific user. For instance, computing system 114 may update the model parameters (e.g., weights of the nodes in a neural network, support vectors in a support vector machine) for the user of hearing instrument 102 and may transmit the personalized updated activity model to hearing instrument 102.

Hearing instrument 102 may receive an updated activity model or a new activity model from edge computing device 112 and/or computing system 114. Responsive to receiving the updated activity model or new activity model, hearing instrument 102 may store the received activity model within activity models 146.

While hearing instrument 102 is described as identifying the type of activity performed by the user, which may also be referred to as "globally active" activities, in some examples, hearing instrument 102 may identify motion that is not associated with an activity performed by the user, such as "globally passive" motion or "locally active motion." As used herein, "globally passive" motion refers to movements that are not generated by the user of hearing instrument 102, such as movement due to movement generated during vehicular transport. In other words, hearing instrument 102 may identify motion caused when the user of hearing instrument is riding an automobile, airplane, or other vehicle. As used herein, "locally active" motion refers to movements generated by user of hearing instrument 102 that are not associated with movement of the user's whole body, such as typing or tapping a foot or hand. In this way, hearing instrument 102 may identify motion of the user's body that does not involve motion of the user's entire body. In some examples, hearing instrument 102 may determine concurrent types of passive and active activities by applying various activity models to the senor data. For example, hearing instrument 102 (or edge computing device 112 or computing system 114) may determine a complex activity, such as "The user is nodding his/her head and walking inside a train."

Techniques of this disclosure may enable hearing instrument 102 to utilize motion data indicative of motion of the user's head to determine a type of activity performed by the user of hearing instrument 102. Utilizing motion data indicative of motion of the user's head rather than another body part (e.g., a wrist) may enable hearing instrument 102 to more accurately determine different types of activities performed by the user. Moreover, rather than transferring raw motion data to another computing device for determining the type of activity, determining the type of activity performed by the user at hearing instrument 102 may enable the hearing instrument to transfer less data, which may increase the battery life of the hearing instrument.

Figure 2:
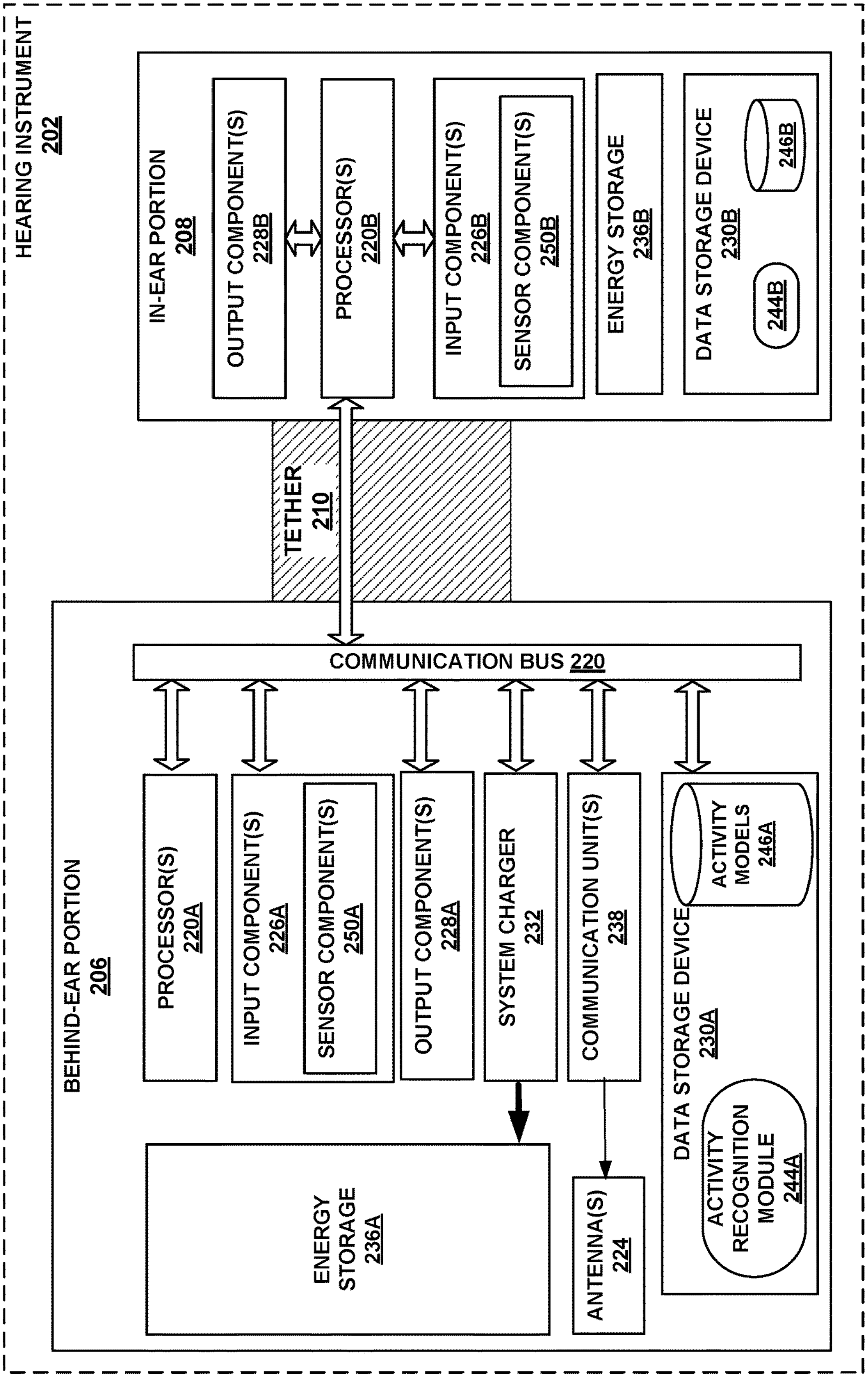
FIG. 2 is a block diagram illustrating an example of a hearing instrument, in accordance with one or more aspects of the present disclosure.

FIG. 2 is a block diagram illustrating an example of a hearing instrument 202, in accordance with one or more aspects of the present disclosure. As shown in the example of FIG. 2, hearing instrument 202 includes a behind-ear portion 206 operatively coupled to an in-ear portion 208 via a tether 210. Hearing instrument 202, behind-ear portion 206, in-ear portion 208, and tether 210 are examples of hearing instrument 102, behind-ear portion 106, in-ear portion 108, and tether 110 of FIG. 1, respectively. It should be understood that hearing instrument 202 is only one example of a hearing instrument according to the described techniques. Hearing instrument 202 may include additional or fewer components than those shown in the example of FIG. 2.

In some examples, behind-ear portion 206 includes one or more processors 220A, one or more antennas 224, one or more input components 226A, one or more output components 228A, data storage device 230A, a system charger 232, energy storage 236A, one or more communication units 238, and communication bus 240. In the example of FIG. 2, in-ear portion 208 includes one or more processors 220B, one or more input components 226B, one or more output components 228B, data storage device 230B, and energy storage 236B.

Communication bus 240 interconnects at least some of the components 220, 224, 226, 228, 230, 232, and 238 for inter-component communications. That is, each of components 220, 224, 226, 228, 230, 232, and 238 may be configured to communicate and exchange data via a connection to communication bus 240. In some examples, communication bus 240 is a wired or wireless bus. Communication bus may include a system bus, a network connection, an inter-process communication data structure, or any other method for communicating data.

Input components 226A-226B (collectively, input components 226) are configured to receive various types of input, including tactile input, audible input, image or video input, sensory input, and other forms of input. Non-limiting examples of input components 226 include a presence-sensitive input device or touch screen, a button, a switch, a key, a microphone, a camera, or any other type of device for detecting input from a human or machine. Other non-limiting examples of input components 226 include one or more sensor components 250A-250B (collectively, sensor components 250). In some examples, sensor components 250 include one or more motion sensing devices (e.g., motion sensing devices 116 of FIG. 1, such as an accelerometer, a gyroscope, a magnetometer, an inertial measurement unit (IMU), among others) configured to generate motion data indicative of motion of hearing instrument 202. The motion data may include processed and/or unprocessed data representing the motion. Sensors 250 may include physiological sensors, such as temperature sensors, heart rate sensors, heart rate variability sensors (e.g., an electrocardiogram or EKG), pulse oximeter sensor (e.g., which may measure oxygen saturation (e.g., SpO2) or changes in blood volume (e.g., via a photoplethysmogram (PPG)), electrodes (such as an electrodes used to perform an Electroencephalogram (EEG), Electrooculography (EOG), Electromyography (EMG), or an EKG), a glucose sensor, among others. Some additional examples of sensor components 250 include a proximity sensor, a global positioning system (GPS) receiver or other type of location sensor, an environmental temperature sensor, a barometer, an ambient light sensor, a hydrometer sensor, aa magnetometer, aa compass, an antennae for wireless communication and location sensing, to name a few other non-limiting examples.

Output components 228A-228B (collectively, output components 228) are configured to generate various types of output, including tactile output, audible output, visual output (e.g., graphical or video), and other forms of output. Non-limiting examples of output components 228 include a sound card, a video card, a speaker, a display, a projector, a vibration device, a light, a light emitting diode (LED), or any other type of device for generating output to a human or machine.

One or more communication units 238 enable hearing instrument 202 to communicate with external devices (e.g., edge computing device 112 and/or computing system 114 of FIG. 1) via one or more wired and/or wireless connections to a network (e.g., network 118 of FIG. 1). Communication units 238 may transmit and receive signals that are transmitted across network 118 and convert the network signals into computer-readable data used by one or more of components 220, 224, 226, 228, 230, 232, and 238. One or more antennas 224 are coupled to communication units 238 and are configured to generate and receive the signals that are broadcast through the air (e.g., via network 118).

Examples of communication units 238 include various types of receivers, transmitters, transceivers, BLUETOOTH® radios, short wave radios, cellular data radios, wireless network radios, universal serial bus (USB) controllers, proprietary bus controllers, network interface cards, optical transceivers, radio frequency transceivers, or any other type of device that can send and/or receive information over a network. In cases where communication units 238 include a wireless transceiver, communication units 238 may be capable of operating in different radio frequency (RF) bands (e.g., to enable regulatory compliance with a geographic location at which hearing instrument 202 is being used). For example, a wireless transceiver of communication units 238 may operate in the 900 MHz or 2.4 GHz RF bands. A wireless transceiver of communication units 238 may be a near-field magnetic induction (NFMI) transceiver, and RF transceiver, an Infrared transceiver, an ultrasonic transceiver, or other type of transceiver.

In some examples, communication units 238 are configured as wireless gateways that manage information exchanged between hearing instrument 202, edge computing device 112, computing system 114, and other hearing instruments. As a gateway, communication units 238 may implement one or more standards-based network communication protocols, such as Bluetooth®, Wi-Fi®, GSM, LTE, WiMax®, 802.1X, Zigbee®, LoRa® and the like as well as non-standards-based wireless protocols (e.g., proprietary communication protocols). Communication units 238 may allow hearing instrument 202 to communicate, using a preferred communication protocol implementing intra- and inter-body communication (e.g., an intra or inter body network protocol), and convert the intra- and inter-body communications to a standards-based protocol for sharing the information with other computing devices, such as edge computing device 112 and/or computing system 114. Whether using a body network protocol, intra- or inter-body network protocol, body-area network protocol, body sensor network protocol, medical body area network protocol, or some other intra or inter body network protocol, communication units 238 enable hearing instrument 202 to communicate with other devices that are embedded inside the body, implanted in the body, surface-mounted on the body, or being carried near a person's body (e.g., while being worn, carried in or part of clothing, carried by hand, or carried in a bag or luggage). For example, hearing instrument 202 may cause behind-ear portion 206 to communicate, using an intra- or inter-body network protocol, with in-ear portion 208, when hearing instrument 202 is being worn on a user's ear (e.g., when behind-ear portion 206 is positioned behind the user's ear while in-ear portion 208 sits inside the user's ear.

Energy storage 236A-236B (collectively, energy storage 236) represents a battery (e.g., a well battery or other type of battery), a capacitor, or other type of electrical energy storage device that is configured to power one or more of the components of hearing instrument 202. In the example of FIG. 2, energy storage 236 is coupled to system charger 232 which is responsible for performing power management and charging of energy storage 236. System charger 232 may be a buck converter, boost converter, flyback converter, or any other type of AC/DC or DC/DC power conversion circuitry adapted to convert grid power to a form of electrical power suitable for charging energy storage 236. In some examples, system charger 232 includes a charging antenna (e.g., NFMI, RF, or other type of charging antenna) for wirelessly recharging energy storage 236. In some examples, system charger 232 includes photovoltaic cells protruding through a housing of hearing instrument 202 for recharging energy storage 236. System charger 232 may rely on a wired connection to a power source for charging energy storage 236.

One or more processors 220A-220B (collectively, processors 220) comprise circuits that execute operations that implement functionality of hearing instrument 202. One or more processors 220 may be implemented as fixed-function processing circuits, programmable processing circuits, or a combination of fixed-function and programmable processing circuits. Examples of processors 220 include digital signal processors, general purpose processors, application processors, embedded processors, graphic processing units (GPUs), digital signal processors (DSPs), application specific integrated circuits (ASICs), field programmable gate arrays (FPGAs), display controllers, auxiliary processors, sensor hubs, input controllers, output controllers, microcontrollers, and any other equivalent integrated or discrete hardware or circuitry configure to function as a processor, a processing unit, or a processing device.

Data storage devices 230A-230B (collectively, data storage devices 230) represents one or more fixed and/or removable data storage units configured to store information for subsequent processing by processors 220 during operations of hearing instrument 202. In other words, data storage devices 230 retain data accessed by activity recognition modules 244A, 244B (collectively, activity recognition modules 244) as well as other components of hearing instrument 202 during operation. Data storage devices 230 may, in some examples, include a non-transitory computer-readable storage medium that stores instructions, program information, or other data associated with activity recognition modules 244. Processors 220 may retrieve the instructions stored by data storage devices 230 and execute the instructions to perform operations described herein.

Data storage devices 230 may include a combination of one or more types of volatile or non-volatile memories. In some cases, data storage devices 230 includes a temporary or volatile memory (e.g., random access memories (RAM), dynamic random-access memories (DRAM), static random-access memories (SRAM), and other forms of volatile memories known in the art). In such a case, data storage devices 230 are not used for long-term data storage and as such, any data stored by storage device 230 is not retained when power to data storage devices 230 are lost. Data storage devices 230 in some cases are configured for long-term storage of information and includes non-volatile memory space that retains information even after data storage devices 230 lose power. Examples of non-volatile memories include flash memories, USB disks, or forms of electrically programmable memories (EPROM) or electrically erasable and programmable (EEPROM) memories.

According to techniques of this disclosure, hearing instrument 202 identifies types of activities performed by a user of hearing instrument 202 based on sensor data generated by one or more sensor components 250. In one example, sensor components 250A generate sensor data by sampling a sensed parameter (e.g., acceleration, temperature, heart rate) over time. Sensor components 250A may divide the sensor data into sample sets that are each associated with a respective time period (e.g., 1 second, 3 seconds, 10 seconds, etc.). In some examples, each sample set includes motion data generated by one or more motion sensing devices over a respective time period. Additionally or alternatively, each sample set may include environmental data (e.g., data indicative of the weather, such as outside temperature) or physiological data (e.g., data indicative of the user's heart rate, heart rate variability (e.g., measured by an electrocardiogram (EKG) sensor), breathing rate, sweat rate, oxygen saturation (SpO2)), brain activity (e.g., measured by an electroencephalogram (EEG) sensor), eye movement (e.g., measured by an Electrooculography (EOG) sensor), among other types of sensor data. One or more of activity recognition modules 244 (e.g., activity recognition module 244A) determines the type of activity performed by the user of hearing instrument 202 during a given time period based at least in part on the motion data generated by one or more motion sensing devices of sensor components 250A during the given time period.

In one example, activity recognition module 244A identifies the activity performed during each time period by applying the sensor data generated during each respective time period to one or more activity models 246. Activity models 246 include a plurality of machine-trained models trained to determine whether the user is performing a particular type of activity. In some examples, each of activity models 246 may be trained to detect a single type of activity, and output data indicating whether or not the user is performing the type of activity that the respective activity model of activity models 246 is trained to detect. Each of activity models 246 may be trained via supervised learning or unsupervised learning. Examples of machine learning models include neural networks, deep-neural networks, parametric models, support vector machines, gaussian mixture models, or other types of machine-trained models.

Activity recognition module 244A applies one or more activity models 246A to the sensor data (including the motion data) for each time period to identify the activity performed by the user during each respective time period. For example, activity recognition module 244A may apply a hierarchy of activity models 246 to the motion data to identify or classify the activity performed by the user of hearing instrument 202 during a given time period. In some instances, activity recognition module 244A applies activity models 246A to motion data and physiological data generated by sensor components 250 to determine the activity performed by the user of hearing instrument 202. Activity recognition module 244A may apply a first activity model of activity models 246A associated with a first activity (e.g., running) to the sensor data collected during a first time period to determine whether the user of hearing instrument 202 performed the first activity during the first time period. In response to determining that the user performed the first type of activity during the first time period, hearing instrument 202 may cease applying the subsequent or subordinate activity models 246A to the motion data for the first time period.

In some instances, activity recognition module 244A applies a second activity model of activity models 246 to the sensor data for the first time period in response to determining that the user did not perform the first type of activity. If activity recognition module 244A determines that the user performed the second type of activity, activity recognition module 244A ceases applying subordinate activity models 246 to the sensor data generated during the first time period. If hearing instrument 202 determines the user did not perform the second type of activity, activity recognition module 244A applies another subordinate activity model of activity models 246 from the hierarchy of activities models to the sensor data generated during the first time period, and so on. In some instances, activity recognition module 244A determines that the user did not perform any of the types of activities that activity models 246 are trained to detect. In such instances, activity recognition module 244A may determine the type of activity performed by the user is unknown.

Activity recognition module 244A may determine the type of activity performed by the user based on data received from another hearing instrument. For example, a user may utilize hearing instrument 202 in one ear (e.g., the left ear) and another hearing instrument in the other ear (e.g., the right ear). In one example, hearing instrument 202 receives sensor data from another hearing instrument and applies models 246A to the sensor data from the other hearing instrument in a similar manner as described above. Additionally or alternatively, in one example, hearing instrument 202 receives data from another hearing instrument indicating a type of activity performed by the user during each time period. For example, hearing instrument 202 and the other hearing instrument may independently determine the type of activity performed by the user and compare the types of activity. As one example, activity recognition module 244A may determine whether the type of activity determined by activity recognition module 244 of hearing instrument 202 is the same type of activity determined by another hearing instrument 202 worn by the user. In some examples, activity recognition module 244A outputs data indicating a discrepancy to another computing device (e.g., edge computing device 112 or computing system 114) in response to detecting that the type of activity identified by activity recognition module 244A is different than the type of activity determined by the other hearing instrument. In some examples, the data indicating the discrepancy includes an indication of the sensor data (e.g., processed and/or unprocessed motion data).

While described as activity recognition module 244A determining the type of activity performed by the user, in some scenarios, activity recognition module 244B may identify the activity performed by the user of hearing instrument 202 based on sensor data generated by sensor components 250B. In examples where behind-ear portion 206 includes activity models 246A and in-ear portion 208 includes activity models 246B, activity models 246A may be the same or different than activity models 246B. As one example, in-ear portion 208 may include fewer activity recognition modules 246, different (e.g., simpler, less computationally expensive) activity recognition modules 246, or both. In such examples, activity recognition module 244AB of in-ear portion 246B may attempt to locally identify the activity performed by the user using activity models 246B. If activity recognition module 244B is unable to identify the activity using activity models 246B, in-ear portion 208 may transmit the sensor data to behind-ear portion 206 to identify the activity performed by the user using activity models 246. In examples where in-ear portion 246B includes sensor components 250B, including activity models 246B within in-ear portion 208 may enable in-ear portion 208 to process data from sensors within in-ear portion 208 to identify the activities performed by the user, which may reduce the amount of data transmitted to behind-ear portion 206 (e.g., relative to transmitting sensor data to behind-ear portion 206 to identify the activity) and potentially increase battery life of energy storage 236B.

Activity recognition module 244A may determine the type of activity performed by the user for each time period. For example, hearing instrument 202 may apply the hierarchy of activity models 246 to the motion data for each respective time period to determine an activity performed by the user during each respective time period, in a similar manner as described above. In some examples, activity recognition module 244A outputs data indicating the type of activity performed during each time period to another computing device (e.g., edge computing device 112 and/or computing system 114 of FIG. 1).

In some examples, activity recognition module 244A may detect transitions between postures for more complex activity characterization. For example, activity recognition module 244A may implement a state-based approach (e.g., a hidden Markov model or a neural network) to detect a transition between a sitting posture of a resting activity and a lying down posture of a resting activity.

In one example, activity recognition module 244A may determine that the user has performed several different types of activities within a threshold amount of time (e.g., one minute, five minutes, etc.) of one another. The threshold amount of time may be an amount of time in which it is unlikely for the user to perform different activities. For example, activity recognition module 244A may determine that the user performed a first activity (e.g., running) during a first time period, a second activity (e.g., bicycling) during a subsequent time period that is within the threshold amount of time of the first and second time periods, and a third activity during a subsequent time period that is within the threshold amount of time of the first and second time periods.

In one scenario, activity recognition module 244A may determine that the first type of activity is different than the second activity, and that the second type of activity is different than the third type of activity. In such scenarios, activity recognition module 244A may perform an action to re-assign or re-classify the type of activity for the first activity, the second activity, the third activity, or a combination therein. In some instances, activity recognition module 244A determines that the first and second types of activity are the same and that the second type of activity is different than the first and second types of activity. In such instances, activity recognition module 244A may re-assign the second type of activity to match the first and second type of activity.

Activity recognition module 244A may perform an action to re-assign the type of activity by outputting a command to another computing device, such as edge computing device 112 of FIG. 1, to determine the type of activity during each of the first, second, and third time periods. In some instances, the command includes processed or unprocessed motion data. Edge computing device 112 may determine the type of activity performed by the user for each of the time periods and may re-assign the type of activity for one or more time periods. In some examples, edge computing device 112 updates an activity log associated with the user based on the type of activity as determined by edge computing device 112.

Hearing instrument 202 may receive data indicative of an update to one or more activity models. For example, edge computing device 112 or computing system 114 may update the structure of an activity model and/or the parameters of an activity model, and may output the updated activity model to hearing instrument 202. Responsive to receiving the updated activity model, hearing instrument 202 may update or replace the respective activity model within activity models 246A.

Hearing instrument 202 may determine an updated hierarchy of the plurality of activity models 246. In some examples, an initial hierarchy of activity models 246 may be based on the parameters of activity models 246A (e.g., which may affect the processing power and battery utilized when executing an activity model of activity models 246) or a probability of the respective activities actually being performed. In one example, hearing instrument 202 updates the hierarchy based on historical activity data associated with the user of hearing instrument 202. For example, hearing instrument 202 or another computing device (e.g., edge computing device 112 or computing system 114) may store historical activity data indicative of previous types of activities performed by the user. Hearing instrument 202 may re-rank or re-assign the priority of activity models 246 based on the historical activity data associated with the user of hearing instrument 202. For example, hearing instrument 202 may query the historical activity data to determine the most frequently performed activity and may assign the activity model of activity models 246 associated with the most frequently performed activity as the first, or primary activity model in the hierarchy of activity models 246. Similarly, hearing instrument 202 may assign the subsequent or subordinate activity models 246 within the hierarchy of activity models 246 based on the historical activity data. In one example, hearing instrument 202 determines the updated hierarchy by determining the most frequently performed activity for a particular day of the week, time of day, location, etc.

While activity recognition module 244A is described as identifying the types of activities performed by the user of hearing instrument 202 based on sensor data generated by sensor components 250A, in some examples, recognition module 244A identifies the types of activity based additionally or alternatively on sensor data generated by sensor components 250B. Similarly, in some examples, activity recognition module 244B may identify the types of activities performed by the user based on sensor data from sensor components 250A and/or 250B.

Figure 3:
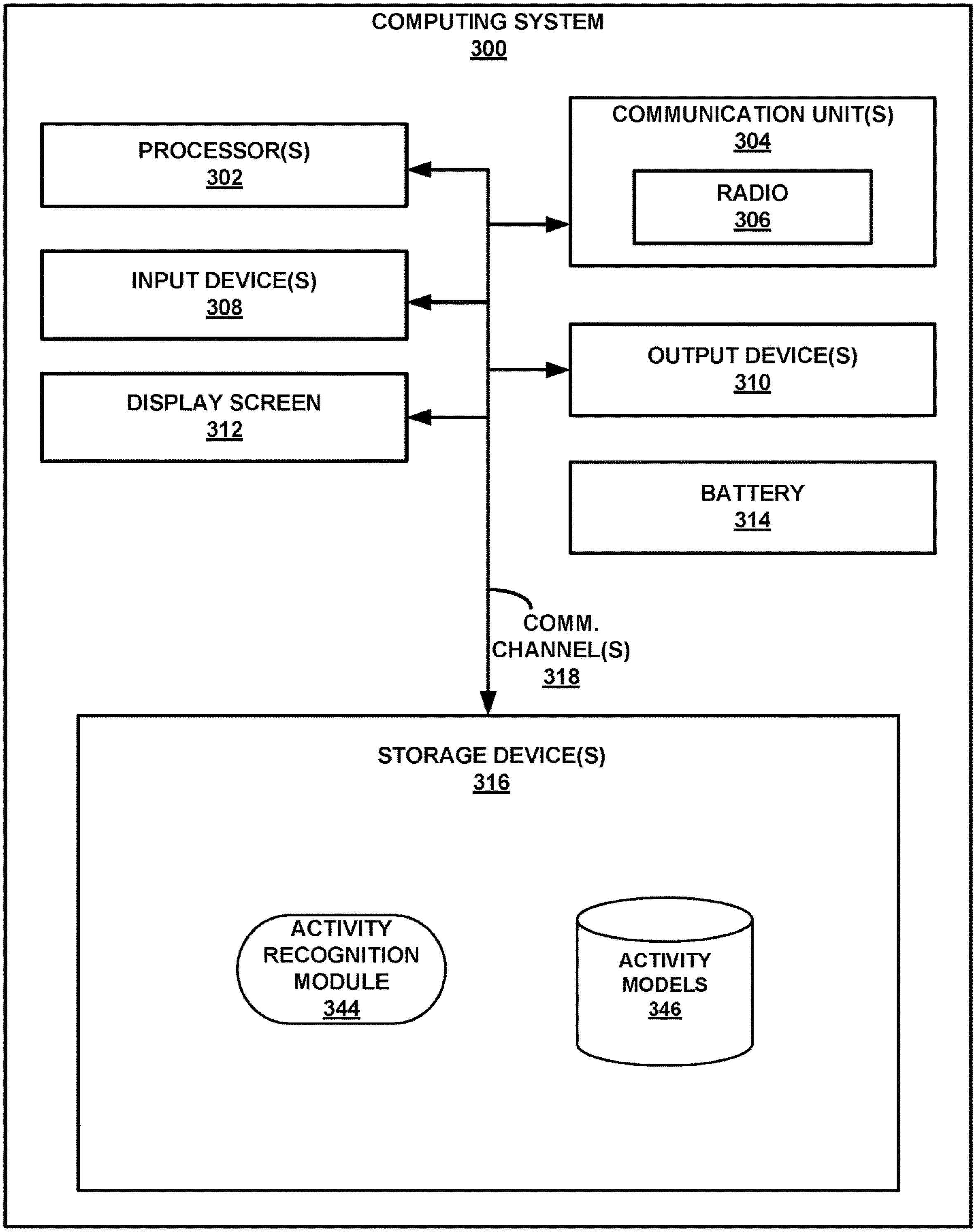
FIG. 3 is a conceptual diagram illustrating an example computing system, in accordance with one or more aspects of the present disclosure.

FIG. 3 is a block diagram illustrating example components of computing system 300, in accordance with one or more aspects of this disclosure. FIG. 3 illustrates only one particular example of computing system 300, and many other example configurations of computing system 300 exist. Computing system 300 may be an example of edge computing device 112 and/or computing system 114 of FIG. 1. For instance, computing system 300 may be mobile computing device, a laptop or desktop computing device, a distributed computing system, an accessory device, or any other type of computing system.

As shown in the example of FIG. 3, computing system 300 includes one or more processors 302, one or more communication units 304, one or more input devices 308, one or more output devices 310, a display screen 312, a battery 314, one or more storage devices 316, and one or more communication channels 318. Computing system 300 may include many other components. For example, computing system 300 may include physical buttons, microphones, speakers, communication ports, and so on. Communication channel(s) 318 may interconnect each of components 302, 304, 308, 310, 312, and 316 for inter-component communications (physically, communicatively, and/or operatively). In some examples, communication channel(s) 318 may include a system bus, a network connection, an inter-process communication data structure, or any other method for communicating data. Battery 314 may provide electrical energy to one or more of components 302, 304, 308, 310, 312 and 316.

Storage device(s) 316 may store information required for use during operation of computing system 300. In some examples, storage device(s) 316 have the primary purpose of being a short term and not a long-term computer-readable storage medium. Storage device(s) 316 may be volatile memory and may therefore not retain stored contents if powered off. Storage device(s) 316 may further be configured for long-term storage of information as non-volatile memory space and retain information after power on/off cycles. In some examples, processor(s) 302 on computing system 300 read and may execute instructions stored by storage device(s) 316.

Computing system 300 may include one or more input device(s) 308 that computing system 300 uses to receive user input. Examples of user input include tactile, audio, and video user input. Input device(s) 308 may include presence-sensitive screens, touch-sensitive screens, mice, keyboards, voice responsive systems, microphones or other types of devices for detecting input from a human or machine.

Communication unit(s) 304 may enable computing system 300 to send data to and receive data from one or more other computing devices (e.g., via a communications network, such as a local area network or the Internet). In some examples, communication unit(s) 304 may include wireless transmitters and receivers that enable computing system 300 to communicate wirelessly with the other computing devices. For instance, in the example of FIG. 3, communication unit(s) 304 include a radio 306 that enables computing system 300 to communicate wirelessly with other computing devices, such as hearing instrument 102, 202 of FIGS. 1, 2, respectively. Examples of communication unit(s) 304 may include network interface cards, Ethernet cards, optical transceivers, radio frequency transceivers, or other types of devices that are able to send and receive information. Other examples of such communication units may include Bluetooth, 3G, and WiFi radios, Universal Serial Bus (USB) interfaces, etc. Computing system 300 may use communication unit(s) 304 to communicate with one or more hearing instruments 102, 202. Additionally, computing system 300 may use communication unit(s) 304 to communicate with one or more other computing devices).

Output device(s) 310 may generate output. Examples of output include tactile, audio, and video output. Output device(s) 310 may include presence-sensitive screens, sound cards, video graphics adapter cards, speakers, liquid crystal displays (LCD), or other types of devices for generating output.

Processor(s) 302 may read instructions from storage device(s) 316 and may execute instructions stored by storage device(s) 316. Execution of the instructions by processor(s) 302 may configure or cause computing system 300 to provide at least some of the functionality ascribed in this disclosure to computing system 300. As shown in the example of FIG. 3, storage device(s) 316 include computer-readable instructions associated with activity recognition module 344. Additionally, in the example of FIG. 3, storage device(s) 316 may store activity models 346.

Execution of instructions associated with activity recognition module 344 may cause computing system 300 to perform one or more of various functions described in this disclosure with respect to computing system 114 of FIG. 1 and/or hearing instruments 102, 202 of FIGS. 1, 2, respectively. For example, execution of instructions associated with activity recognition module 344 may cause computing system 300 to configure radio 306 to wirelessly send data to other computing devices (e.g., hearing instruments 102, 202,) and receive data from the other computing devices. Additionally, execution of instructions of activity recognition module 344 may cause computing system 300 to determine the types of activities performed by a user of a hearing instrument (e.g., hearing instrument 102, 202 of FIGS. 1, 2, respectively).

In some examples, activity recognition module 344 receives data indicative of sensor data generated by sensors of a hearing instrument (e.g., hearing instrument 202 of FIG. 2). For example, activity recognition module 344 may receive processed and/or unprocessed motion data from hearing instrument 202 in response to hearing instrument 202 determining that the type of activity performed by the user is unknown.

Activity recognition module 344 may determine the type of activity performed by the user during one or more time periods by applying a hierarchy of activity models 346 to the motion data in a manner similar to activity recognition modules 144 and 244 of FIGS. 1 and 2, respectively. In some examples, activity models 346 includes additional or different activity models relative to activity models 146 and 246. For example, activity models 346 may detect additional types of activities relative to activity models stored on hearing instruments 102, 202. In other examples, activity models 346 may include more complex activity models (e.g., more inputs, more hidden layers, etc.) relative to activity models stored on hearing instruments 102, 202. In this way, activity recognition module 344 may utilize the additional computing resources of computing system 300 to more accurately classify activities performed by the user or classify activities that hearing instruments 102, 202 are unable to identify.

In some examples, activity recognition module 344 may update one or more activity models 346 based on historical user activity data received from hearing instruments 102, 202. For example, activity recognition module 344 may re-train activity models 346 based on the historical user activity for a single user of a single hearing instrument or for a plurality of users of a plurality of hearing instruments. Activity recognition module 344 may transmit the updated activity models 346 to hearing instruments 102, 202 such that hearing instruments 102, 202 may update activity models 146, 246, respectively. In one example, activity recognition module 344 updates the hierarchy of activity models 346 based on the historical user activity data and outputs information indicating the updated hierarchy to hearing instruments 102, 202. For example, activity recognition module may rank the activities performed by a single user or a set or population of users and may update the hierarchy activities models 346 based on the rankings.

In some examples, activity recognition module 344 may output a graphical user interface indicative of the activities performed by the user of a hearing instrument. For example, the graphical user interface may aggregate the types of physical activities over a plurality of time periods in a manner similar to graphical user interface 120 of FIG. 1.

Figure 4:
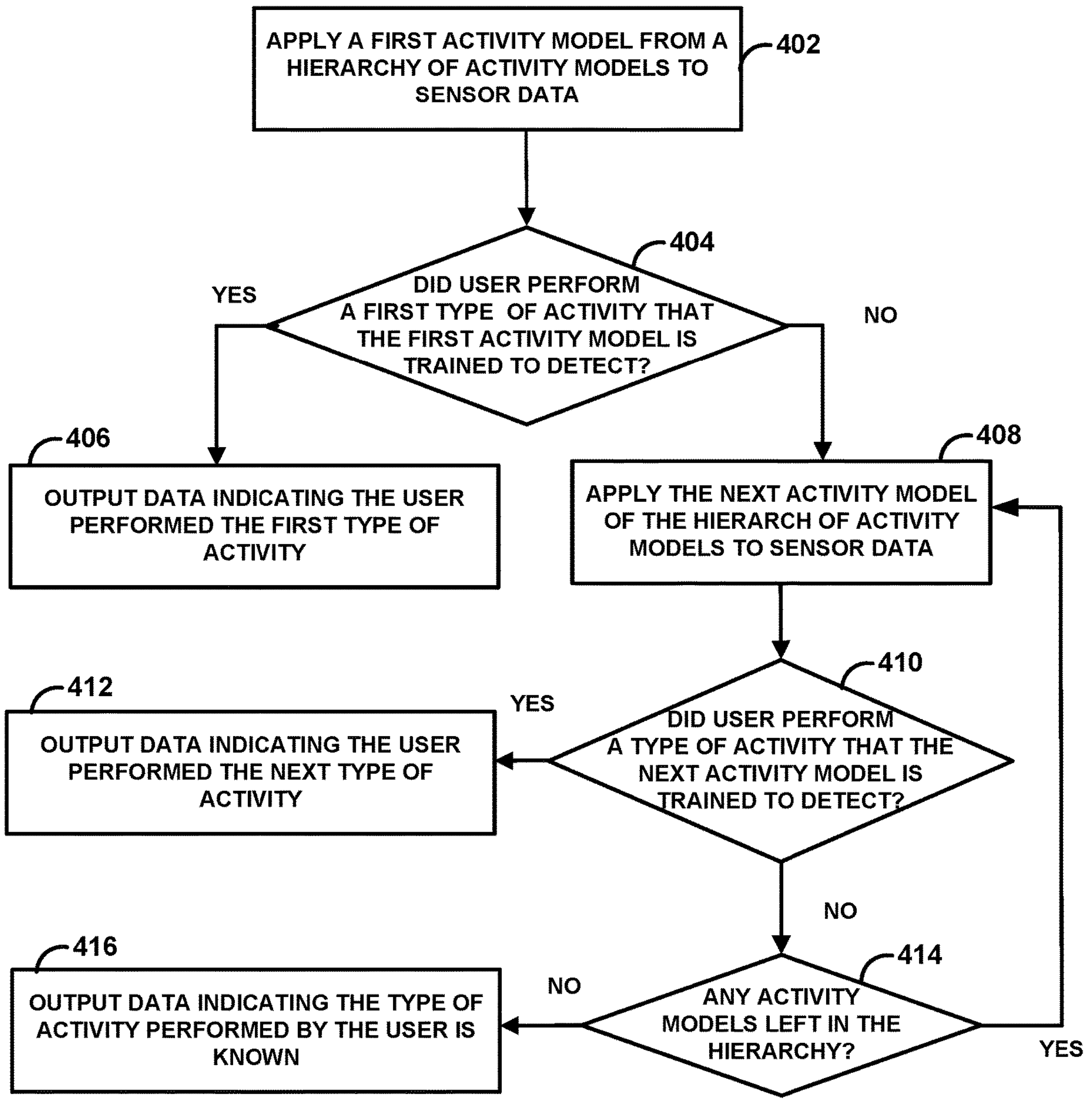
FIG. 4 is a flow diagram illustrating example operations of a computing device, in accordance with one or more aspects of the present disclosure.

FIG. 4 is a flowchart illustrating an example operation of hearing instrument 202, in accordance with one or more aspects of this disclosure. The flowchart of FIG. 4 is provided as an example. In other examples, operation shown in the flowchart of FIG. 4 may include more, fewer, or different actions, or actions may be performed in different orders or in parallel.

Activity recognition module 244 applies a first activity model of activity models 246 of a hierarchy of activity models 246 to sensor data generated by sensor components 250 of hearing instrument 202 (402). In other words, the input to the first activity model of activity models 246 includes the sensor data. In some examples, the sensor data includes motion data generated by a motion sensor (e.g., motion sensing device 116 of FIG. 1). The sensor data may also include environmental data, physiological data, or both. The output of the first activity model includes, in some examples, an indication of whether the user performed a first type of activity that the first activity model is trained to detect. For example, the output of the first activity model of activity models 246 may include a binary output (e.g., "biking" or "not biking", "running" or "not running", "yes" or "no", or other affirmative and negative binary pair).

Responsive to determining that the user performed the first type of activity ("YES" path of 404), activity recognition module 244 outputs data indicating that the user performed the first type of activity (406). For example, if the output of the first activity model of activity models 246 is an affirmative output (e.g., "yes", "resting", "biking", etc.), activity recognition module 244 may output a message indicating the type of activity to one or more computing devices (e.g., edge computing device 112 and/or computing system 114 of FIG. 1).

Responsive to determining that the user did not perform the first type of activity ("NO" path of 404), activity recognition module 244 applies the next activity model in the hierarchy of activity models 246 to the motion data (408). For example, if the output of the first activity model of activity models 246 is a negative output (e.g., "no", "not running", "not resting", etc.), activity recognition module 244 may apply the next, subordinate activity model from the hierarchy of activity models 246 to the sensor data. As one example, if the first activity model of activity models 246 is trained to detect running and the output of the first activity model of activity models 246 indicates the user is not running, activity recognition module of activity models 246 may apply a second activity model (e.g., that is trained to detect resting) to the sensor data to determine whether the user performed the second type of activity that the second activity model is trained to detect.

Responsive to determining that the user performed the type of activity that the next activity model of activity models 246 is trained to detect ("YES" path of 410), activity recognition module 244 outputs data indicating that the user performed the second type of activity (412). For example, if the output of the next activity model of activity models 246 is an affirmative output, activity recognition module 244 may output a message indicating the type of activity to edge computing device 112 and/or computing system 114 of FIG. 1.

Responsive to determining that the user did not perform the next type of activity ("NO" path of 410), activity recognition module 244 determines whether there are any activity models 246 left in the hierarchy of activity models 246 (414). For example, activity recognition module 244 may query activity models 246 to determine whether there are any additional activity models that have not been applied to the sensor data. If activity recognition module 244 determines that the hierarchy of activity models 246 includes another activity model ("YES" path of 414), activity recognition module 244 applies the next activity model in the hierarchy of activity models 246 to the motion data (408). Activity recognition module 244 may continue applying activity models to the sensor data one activity model at a time until a particular activity model of activity models 246 determines the user performed the activity that the particular activity model of activity models 246 is trained to detect or until all of activity models 246 have been applied to the sensor data and have output a negative output.

Responsive to determining that there are not any additional activity models left in the hierarchy ("NO" path of 414), activity recognition module 244 outputs data indicating that the type of activity performed by the user is unknown (416). For example, activity recognition module 244 may output a message to edge computing device 112 and/or computing system 114 that indicates the type of activity is unknown and that includes an indication of the sensor data (e.g., processed and/or unprocessed sensor data). In this way, edge computing device 112 and/or computing system 114 may apply different activity models to the sensor data to identify the activity performed by the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection may be considered a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transitory, tangible storage media. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A hearing instrument comprising:

a memory configured to store a plurality of machine trained activity models, each of the machine trained activity models corresponding to a respective type of activity; and at least one processor configured to:

determine, by applying a hierarchy of the plurality of machine trained activity models to motion data indicative of motion of the hearing instrument, a type of activity performed by a user of the hearing instrument, wherein the machine trained activity models are ranked within the hierarchy by probabilities of the user performing the respective types of activities corresponding to the machine trained activity models; and responsive to determining the type of activity performed by the user, output data indicating the type of activity performed by the user.

2. The hearing instrument of claim 1, wherein the hierarchy of the plurality of machine trained activity models includes a first machine trained activity model trained to detect a first type of activity and a second machine trained activity model trained to detect a second type of activity different than the first type of activity, wherein the at least one processor is configured to apply the hierarchy of machine trained activity models by at least being configured to:

apply the first machine trained activity model to the motion data to determine whether the user is performing the first type of activity;

responsive to determining that the user is not performing the first type of activity, apply the second machine trained activity model to the motion data to determine whether the user is performing the second type of activity; and responsive to determining that the user is performing the second type of activity, determining the second type of activity is the type of activity performed by the user.

3. The hearing instrument of claim 2, wherein the plurality of machine trained activity models includes a third machine trained activity model trained to detect a first sub-type of activity that is associated with the second type of activity and a fourth machine trained activity model trained to detect a second sub-type of activity that is associated with the second type of activity, wherein the first sub-type of activity is different than the second sub-type of activity, and wherein the at least one processor is further configured to:

apply the third machine trained activity model to the motion data to determine whether the user is performing the first sub-type of activity;

responsive to determining that the user is not performing the first sub-type of activity, apply the fourth machine trained activity model to the motion data to determine whether the user is performing the second sub-type of activity; and responsive to determining that the user is performing the second sub-type of activity, determining the second sub-type of activity is the type of activity performed by the user.

4. The hearing instrument of claim 1, wherein the hearing instrument is a first hearing instrument, and wherein the at least one processor is further configured to:

receive, from a second hearing instrument, data indicating another type of activity performed by the user;

determine whether the type of activity is the same as the other type of activity; and responsive to determining that the type of the activity is different than the other type of activity, output an indication of the motion data to an edge computing device.

5. The hearing instrument of claim 2, wherein the at least one processor is further configured to:

determine the type of activity is unknown in response to determining that the type of the activity is neither the first type of activity or the second type of activity; and responsive to determining that the type of activity is unknown, output an indication of the motion data to an edge computing device.

6. The hearing instrument of claim 1, wherein the type of activity performed by the user is a type of activity performed by the user during a first time period, and wherein the at least one processor is further configured to:

determine a type of activity performed by the user during a second time period that is within a threshold amount of time of the first time period;

determine a type of activity performed by the user during a third time period that is within the threshold amount of time of the second time period; and responsive to determining that the type of the activity performed by the user during the first time period is different than the type of the activity performed by the user during the second time period and that the type of the activity performed by the user during the second time period is different than the type of the activity performed by the user during the third time period, perform an action to re-assign at least one of the type of activity performed by the user during the first time period, the type of activity performed by the user during the second time period, or the type of activity performed by the user during the third time period.

7. The hearing instrument of claim 6, wherein the at least one processor is configured to perform the action by at least being configured to:

responsive to determining that the type of the activity performed by the user during the first time period is the same as the type of the activity performed by the user during the third time period, assign the type of activity performed by the user during the second time period as the type of activity performed by the user during the first time period and the type of activity performed by the user during the third time period.

8. The hearing instrument of claim 6, wherein the at least one processor is configured to perform the action by at least being configured to:

output a command causing an edge computing device to determine the type of activity performed during each respective time period of the first time period, the type of activity performed by the user during the second time period, and the type of activity performed by the user during the third time period, wherein the command includes an indication of the motion data.

9. The hearing instrument of claim 1, wherein the at least one processor is further configured to:

receive data indicative of an update to a machine trained activity model of the plurality of machine trained activity models; and update the machine trained activity model stored in the memory.

10. The hearing instrument of claim 1, wherein the at least one processor is further configured to determine an updated hierarchy of the plurality of machine trained activity models.

11. The hearing instrument of claim 10, wherein the at least one processor is further configured to determine the updated hierarchy of the plurality of machine trained activity models by at least being configured to:

determine, based on historical activity data associated with the user, a type of activity most frequently performed by the user; and assign a machine trained activity model associated with the type of activity most frequently performed as a first machine trained activity model in the updated hierarchy.

12. A method comprising:

receiving, by at least one processor, motion data indicative of motion of a hearing instrument;

determining, by the at least one processor, a type of activity performed by a user of the hearing instrument by applying a hierarchy of a plurality of machine trained activity models to the motion data, wherein each of the machine trained activity models corresponds to a respective type of activity and the machine trained activity models are ranked within the hierarchy by probabilities of the user performing the respective types of activity corresponding to the machine trained activity models; and responsive to determining the type of activity performed by the user, outputting data indicating the type of activity performed by the user.

13. The method of claim 12, wherein the hierarchy of the plurality of machine trained activity models includes a first machine trained activity model trained to detect a first type of activity and a second machine trained activity model trained to detect a second type of activity different than the first type of activity, wherein applying the hierarchy of machine trained activity models comprises:

applying, by the at least one processor, the first machine trained activity model to the motion data to determine whether the user is performing the first type of activity;

responsive to determining that the user is not performing the first type of activity, applying, by the at least one processor, the second machine trained activity model to the motion data to determine whether the user is performing the second type of activity; and responsive to determining that the user is performing the second type of activity, determining, by the at least one processor, the second type of activity is the type of activity performed by the user.

14. The method of claim 13, wherein the plurality of machine trained activity models includes a third machine trained activity model trained to detect a first sub-type of activity that is associated with the second type of activity and a fourth machine trained activity model trained to detect a second sub-type of activity that is associated with the second type of activity, wherein the first sub-type of activity is different than the second sub-type of activity, the method further comprising:

applying, by the at least one processor, the third machine trained activity model to the motion data to determine whether the user is performing the first sub-type of activity;

responsive to determining that the user is not performing the first sub-type of activity, applying, by the at least one processor, the fourth machine trained activity model to the motion data to determine whether the user is performing the second sub-type of activity; and responsive to determining that the user is performing the second sub-type of activity, determining, by the at least one processor, the second sub-type of activity is the type of activity performed by the user.

15. The method of claim 12, wherein the hearing instrument is a first hearing instrument, the method further comprising:

receiving, by the at least one processor, from a second hearing instrument, data indicating another type of activity performed by the user;

determining, by the at least one processor, whether the type of activity is the same as the other type of activity; and responsive to determining that the type of the activity is different than the other type of activity, outputting, by the at least one processor, an indication of the motion data to an edge computing device.

16. The method of claim 13, further comprising:

determining, by the at least one processor, the type of activity is unknown in response to determining that the type of the activity is neither the first type of activity or the second type of activity; and responsive to determining that the type of activity is unknown, outputting, by the at least one processor, an indication of the motion data to an edge computing device.

17. The method of claim 12, wherein the type of activity performed by the user is a type of activity performed by the user during a first time period, the method further comprising:

determining, by the at least one processor, a type of activity performed by the user during a second time period that is within a threshold amount of time of the first time period;

determining, by the at least one processor, a type of activity performed by the user during a third time period that is within the threshold amount of time of the second time period; and responsive to determining that the type of the activity performed by the user during the first time period is different than the type of the activity performed by the user during the second time period and that the type of the activity performed by the user during the second time period is different than the type of the activity performed by the user during the third time period, performing, by the at least one processor, an action to re-assign at least one of the type of activity performed by the user during the first time period, the type of activity performed by the user during the second time period, or the type of activity performed by the user during the third time period.

18. The method of claim 17, wherein performing the action to re-assign the at least one type of activity comprises:

responsive to determining that the type of the activity performed by the user during the first time period is the same as the type of the activity performed by the user during the third time period, assigning, by the at least one processor, the type of activity performed by the user during the second time period as the type of activity performed by the user during the first time period and the type of activity performed by the user during the third time period.

19. The method of claim 12, further comprising determining, by the at least one processor, an updated hierarchy of the plurality of machine trained activity models.

20. A non-transitory computer-readable storage medium comprising instructions that, when executed by at least one processor of a computing device, cause the at least one processor to:

receive motion data indicative of motion of a hearing instrument;

determine, by applying a hierarchy of a plurality of machine trained activity models to the motion data, a type of activity performed by a user of the hearing instrument, wherein each of the machine trained activity models corresponds to respective type of activity and the machine trained activity models are ranked within the hierarchy by probabilities of the user performing the respective types of activity corresponding to the machine trained activity models; and responsive to determining the type of activity performed by the user, output data indicating the type of activity performed by the user.

* * * * *